United States Patent [19]

Trimbee

[11] 4,248,347
[45] Feb. 3, 1981

[54] PACKAGING FOR FLORIST ARRANGEMENTS

[76] Inventor: Robert J. Trimbee, 1824 Jane St., Weston, Ontario, Canada

[21] Appl. No.: 63,940

[22] Filed: Aug. 6, 1979

[51] Int. Cl.³ .................... B65D 85/50; A01G 9/02; A01G 9/08
[52] U.S. Cl. ................................ 206/423; 206/45.33; 215/100.5
[58] Field of Search .................... 206/423, 562, 45.33; 215/100.5; 248/346.5

[56] References Cited

U.S. PATENT DOCUMENTS

| 2,766,919 | 10/1956 | Randall | 206/562 |
| 3,297,289 | 10/1967 | La Raus | 215/100.5 |
| 4,078,658 | 3/1978 | Neiser | 206/423 |
| 4,118,890 | 10/1978 | Shore | 206/423 |

FOREIGN PATENT DOCUMENTS

231167 2/1944 Switzerland ............................ 206/423

Primary Examiner—William T. Dixson, Jr.

[57] ABSTRACT

A safety packaging for floral arrangement comprises a platform for engagement with a container, a support rod for embedding in a floral arrangement and extending above such arrangement, a plastic bag for receiving platform with arrangement, the bag being closed about the upper portion of the support rod to provide a carrying grip. The packaging facilitates carrying of floral arrangements where the support rod maintains the integrity of the bag. The platform may be generally broader than the expected breadth of the floral arrangement to provide protection during transport. The closure of the bag prevents air exchange and insulates the floral arrangement during colder periods. A transparent bag may be used to visually display the packaged arrangement for inspection before shipment and to solicit a pleasing response on delivery to customer.

22 Claims, 9 Drawing Figures

PACKAGING FOR FLORIST ARRANGEMENTS

FIELD OF THE INVENTION

This invention relates to safety packaging for floral arrangements and more particularly to platforms for engaging floral arrangement containers and combination of bag with platform for transport of floral arrangements.

BACKGROUND OF THE INVENTION

A great deal of time can be spent in preparing a floral arrangement, thus precautions have been taken in packaging and transporting them to ensure that they are not damaged during delivery. In the past, such precautions in packaging have been very time-consuming and do not always ensure safe delivery of the arrangement. One of the significant problems in packaging an arrangement is that the floral portion usually extends two to three times the height of the container where the base of the container is usually significantly narrower than the size of the arrangement. The arrangement, if not handled properly, may, therefore, tip over. Approaches have been taken to provide boxes for floral arrangements to add to their stability, as disclosed in U.S. Pat. Nos. 2,821,297 and 3,128,316. Such container boxes are complex in structure and do not appreciably enhance the stability of the arrangement.

In an attempt to protect the floral arrangement during transport, bags may be used to contain the arrangement such as shown in U.S. Pat. No. 3,431,706. According to one aspect of the floral arrangement disclosed in that patent, a circular platform may be provided which is placed in a bag. The arrangement container or container with platform, as the case may be, in that patent is free to move around within the bag, because the bag, first of all, is not fitted to receive the container or platform and, secondly, there is nothing linking the closed upper portion of the bag to the arrangement. Thus, the arrangement can tip within the bag while carrying, resulting in the arrangement leaning against the plastic and causing damage. Therefore, the bag provided very little, if any, physical protection for the bagged arrangement during carrying and when the arrangement is set down, there are instances when the bag has moved relative to the arrangement which could cause arrangement upset when the bag is lifted for subsequent carrying.

When the several approaches in the past for providing floral arrangement packaging, there have been made available many different sizes and shapes of packaging for different types of arrangement containers, such as vases, thin stemmed glassware, flower pots, wicker baskets and the like. As a result, a florist has had to carry several different types of packages in order to package the different shapes of floral arrangements. Due to the complexity of the prior packaging, it has sometimes been difficult to gain access to the floral arrangement after delivery, thus frustrating the customer and, in some instances, after removing the opaque covering, find that the arrangement has been damaged.

SUMMARY OF THE INVENTION

The packaging arrangement, according to this invention, overcomes a number of the above problems in providing a safety packaging for floral arrangements which accommodate several different designs for arrangement containers and provides a safe manner of carrying and transporting the arrangement. The packaging arrangement also provides increased stability to facilitate handling and transport, and if needed, to steady the arrangement container during arranging of the floral product.

The features and advantages of this invention are realized according to one aspect of the provision of a foldable platform blank which, when folded, is adapted for engagement with floral arrangement containers. The blank is made of waterproof corrugated cardboard with its corrugations extending the blank's length. Two spaced-apart parallel score lines extend transversely of the corrugations to define hinge areas for similar platform end flaps. Each flap free end has a medial recess with a plurality of spaced-apart rows of perforations arranged symmetrically about the outline of said recess. The length of each end flap is greater than one-half and less than the distance between the score lines to provide overlapping end flap portions for securement to each other when folded to engage recess outline with the floral arrangement container. The size of the base portion of the platform between the score lines is selected so as to be greater in breadth compared to the expected breadth of dense portion of the floral arrangement. The platform may not be broader than the overall width of the arrangements, however, considering that the outer extremities of the arrangement may include very light flexible branches or flower stems, they are not readily damaged when packaged in the carrying bag.

The safety aspect of the packaging for the floral arrangement comprises the use of a platform, which may be of the above type. A support rod is embedded in a floral arrangement base and extends from container bottom to above the floral arrangement. The plastic bag has a fitted bottom to receive the platform with bag sides adjacent platform perimeter. The bag is of a length to extend upwardly to the upper portion of the support when embedded. The bag is secured about the rod upper portion to provide carrying grip at bag closure, such securement providing a stable packaging by said secured rod maintaining the platform in the fitted bag portion during handling.

The fitted bag bottom may be gusseted to provide a bag bottom portion with pockets exterior of bottom portion and in communication with bag interior. The pockets provide an inflatable means on platform underside which inflates on carrying a packaged arrangement by air moving from above the platform to beneath into the pockets. This is due to the weight of the carried floral arrangement moving bag sides inwardly. The inflated means, as such, absorbs shock when the carried floral arrangement is set down, as it deflates by returning air to above the platform.

The bag for the packaging may be transparent to visually display the arrangement, thus damage to the arrangement can be detected before delivery and repaired to ensure that the product is in proper form for customer. The use of a platform of a size greater than the expected breadth of the denser portion of arrangement assists in transport, because the arrangement is stable in delivery in a truck without need to secure it in the truck and the packaged arrangement may be located beside one another with the platforms abutting one another to provide a spacing between the denser portions of the packaged floral arrangements. The provision of the spaced-apart rows of perforations about the recess outline in each platform flap provides an arrangement which accommodates varying shapes of arrangement containers by way of permitting a controlled ripping of flap portions forming custom-shaped fingers to secure the particular container. The bag closure maintains air within the bag to assure a somewhat puffed out aspect of the bag to display the arrangement in a pleasing manner and to provide an insulative layer of air about the arrangement.

BRIEF DESCRIPTION OF THE DRAWINGS

Preferred embodiments of the invention are shown in the drawings wherein:

FIG. 9 shows the platform blank of FIG. 7, as folded and engaging a cylindrical essentially straight-sided flower pot or the like.

DETAILED DESCRIPTION OF THE PREFERRED EMBODIMENTS

Figure 1:
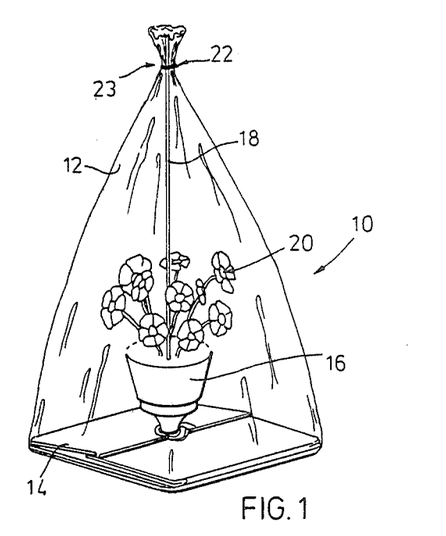
FIG. 1 is a isometric view of safety packaging for floral arrangement.

The safety packaging 10 for a floral arrangement of FIG. 1 comprises a plastic bag 12 having enclosed at its fitted bottom a container platform 14 which engages and secures container 16. A support rod 18, which is embedded at the base of the floral arrangement 20, has the bag 12 closed about its upper portion by, in this embodiment, a wire crimp 22. The bag is puffed out slightly, as shown, so that the bag sides clear the flowers of the floral arrangement 20. The base of the bag is fitted to receive the platform 14 which adds stability to the arrangement and, in view of the relationship of the rod 18 secured to bag by closure 22 and imbedded in base of floral arrangement, provides stability for the entire package.

Figure 3:
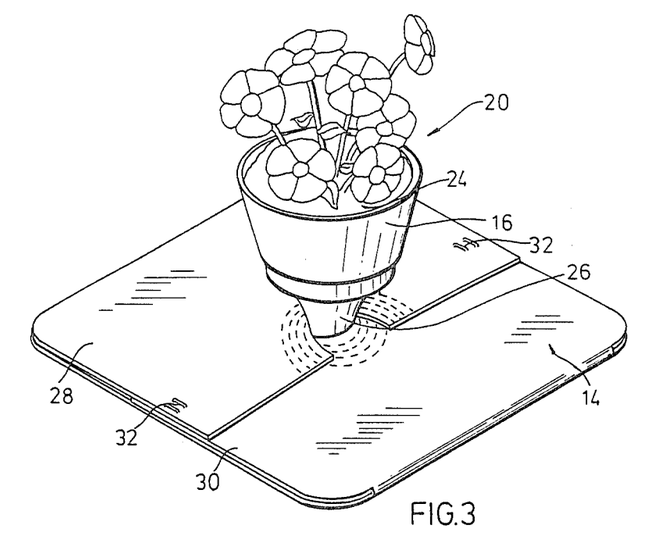
FIG. 3 shows a folded platform blank engaging a floral arrangement container.

Turning to FIG. 3, the floral arrangement 20, as arranged in the base material 24, is contained in the container 16. The pedestal container 16 has pedestal portion 26 engaged by platform flaps and a base portion 29, as shown more clearly in FIG. 4, located beneath the flaps. The platform 14 is, according to a preferred embodiment, folded from a blank of the type shown in FIG. 7, the structure of which will be discussed in more detail.

The purpose of the platform 14, as it engages the pedestal portion 26 of the container 16, is to add stability to the arrangement by substantially adding to the support surface area of the base of the arrangement. The base 29 of the container is sandwiched between flap portions 28 and 30, connected by staples 32, in the manner shown in FIG. 4 to secure the container relative to the platform.

Depending upon the florist, it may be desirable to secure the foldable platform 12 onto container base before the floral arrangement 20 is made up in the container. This adds stability to the container to facilitate arranging of the flowers therein.

Figure 4:
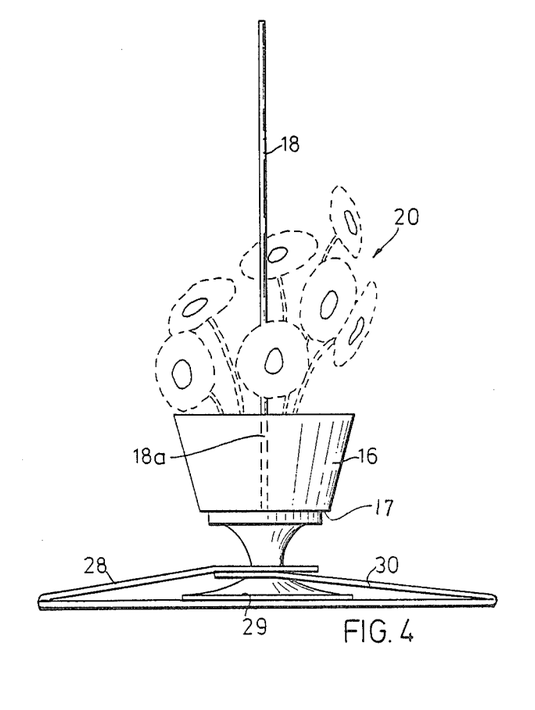
FIG. 4 is an elevation of the arrangement of FIG. 3 having a support rod embedded in the base of the floral arrangement.

After the floral arrangement 20 is provided in the container 16, a support rod 18 has its base portion 18a, as shown in dot, inserted into the base material 24 of the floral arrangement. The support rod 18 extends well above the floral arrangement 20. For purposes of increasing stability of the packaging, the rod may be embedded to the extent that it contacts the bottom 17 of the container 16.

Figure 5:
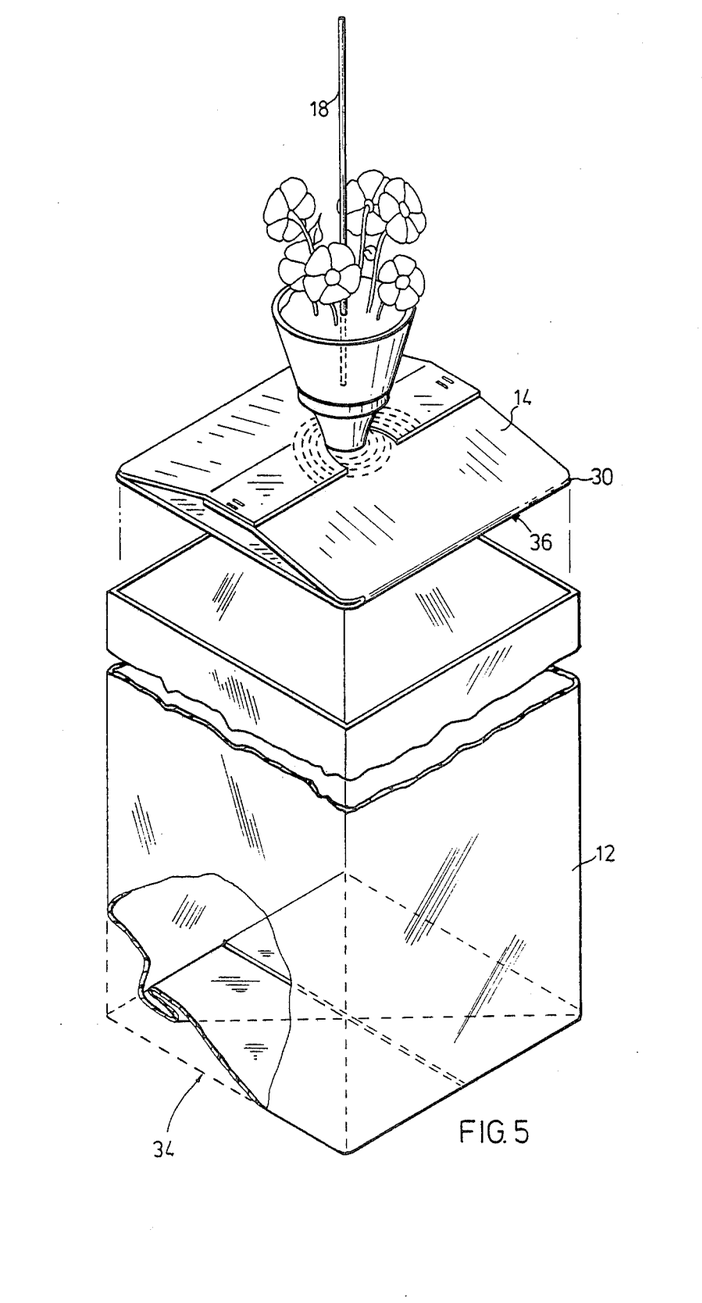
FIG. 5 shows the placing of the arrangement of FIG. 4 into a bag having a gusseted bottom of the type shown in FIG. 2.

Turning to FIG. 5, the floral arrangement of FIG. 4 is, in this instance, lowered into the bag 12. With this embodiment, the platform 14 for the arrangement is essentially rectangular or square-shaped, having radiused corners 30. This facilitates placing of the floral arrangement platform 14 into the bag 12, where the bag 12 has a gusseted bottom portion generally designated 32 to take on the rectangular outline of periphery 34 of the platform 14. It is appreciated that a bagging machine may be used, such as the machine disclosed in U.S. Pat. No. 3,431,706 which would be modified to handle the bag with fitted bottom and corresponding rectangular-shaped bottom.

After the floral arrangement, with platform is placed in the bag 12, the bag is gathered at the top and closed about the rod 18 in the manner shown in FIG. 1. In this particular embodiment, a wire or metal bar 22 is crimped around the gathered portion of the bag to secure bag about rod 18 and to effect an essentially airtight closure of the bag. This gathered-in portion generally designated 23 provides a carrying grip for the floral arrangement. One can simply grab this gathered portion and lift the arrangement for carrying.

This combination for packaging a floral arrangement provides a stable packaging which maintains its stability even during rough handling and also protects the packaged arrangement. The support rod, as secured to the bag at 23, provides a structural link between bag top and base of platform which rests in the bag fitted bottom. The platform remains stationary in fitted bag bottom, because the rod 18 prevents platform from moving out of the bag bottom when the bag is carried or set down. This is due to the rod extending from the bottom of the container upwardly to the point of securement to bag. When the bag is lifted, the rod may move slightly upwardly in the floral arrangement base material 24, commonly referred to floral foam. The upward movement is only slight and is caused by the inward movement of the bag sides as the arrangement is lifted. This interconnection between bag closure, floral arrangement, container platform and fitted bag bottom ensures that the bag bottom does not move relative to the arrangement, such that when the arrangement is set back down, the platform remains in the fitted bag bottom. Further, should the bag be tipped, the rod, as embedded in the floral foam, causes the entire arrangement along with platform to tip, so that the arrangement remains in the central area of the bag and thus is protected by enclosed surrounding air. This form of packaging, therefore, provides an interrelated solid combination where the arrangement becomes part of the structural combination for providing safety packaging and where the arrangement always remains in the central area of the protecting bag.

Figure 6:
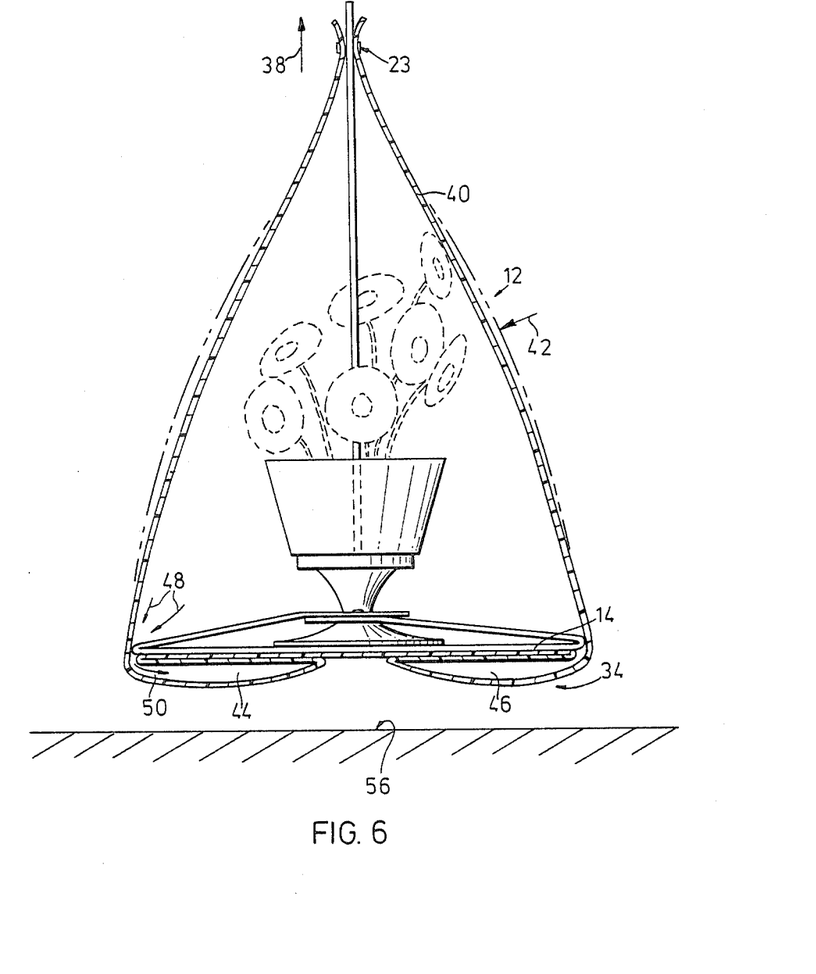
FIG. 6 demonstrates the action of inflating the inflatable means of the safety packaging.

As shown in FIG. 6, when the grip 23 is lifted in the direction of arrow 38, the sidewalls 40 of the bag 12 move inwardly in the direction of arrow 42, due to the weight of the floral arrangement pushing downwardly on the gusseted bag bottom 34. The gusseted arrangement 34 provides at least two inflatable pocket areas 44 and 46 on the exterior of the bag bottom beneath the platform 14. As the bag is lifted and the sidewalls move inwardly in the direction of arrow 42, air is permitted to move in the direction of arrows 48 downwardly about the perimeter of the platform 14, such as over the radiused corners and move in the direction of arrow 50 into the pockets 44 and 46 and inflate same, such as generally shown in FIG. 6.

Figure 2:
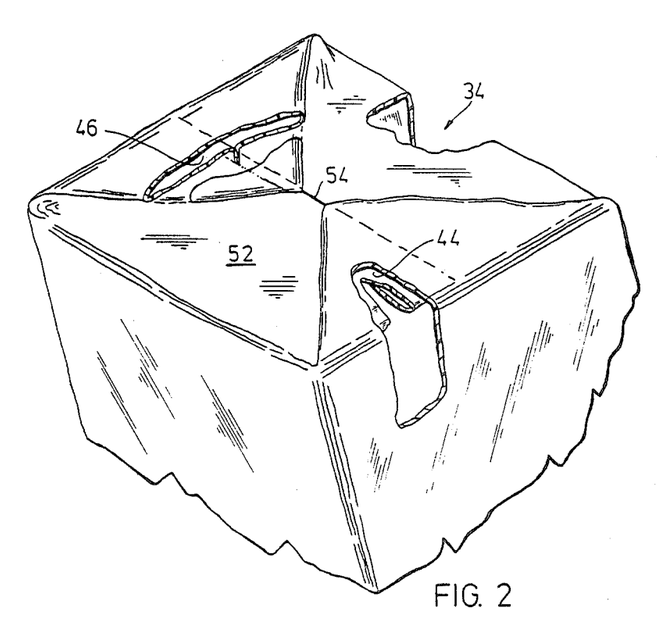
FIG. 2 is a cut-away of the gusseted bag bottom for the safety packaging of FIG. 1.

Turning to FIG. 2, it can be seen that the gusseted bag bottom 34 has two pockets 44 and 46 beneath bottom portion 52 of the bag as interconnected at seam 54. The pockets 44 and 46 are in communication with the interior of the bag.

The movement of the air into the pocket portions 44, 46 when the bag is lifted and carried avoids a sudden increase in pressure in the bag above the platform by permitting this air movement. As a result, there is no significant increase in pressure exerted on the bag closure to thereby ensure that the air is always contained in the bag and permits the use of a lighter bag and appropriate closure. Otherwise, a violent lifting of the arrangement could increase the pressure in the bag above the platform, so as to break the closure thereby necessitating heavier bag and closure to avoid breakage. To eliminate the need for heavier bag and closure and to provide other advantages of the invention, the gussets in the bag bottom are arranged to be reverse of that normally found with the bag, where the continuous portion of the bag is on the inside of the bag adjacent the platform and the gusset pockets are exterior on the bag bottom. This permits the pockets to inflate when the bag is lifted by way of air movement thereinto. As a result and unexpectedly with the arrangement of FIG. 6, when the bag is set down, the inflated pockets 44, 46 act as shock absorbers to absorb any shock, should the arrangement be set down heavily onto floor 56. The shock is absorbed by way of deflating the pockets and forcing the air within the pockets to return to the upper portion of the bag. This action of air return moves the bag sidewalls outwardly again to resume the puffed-air pleasing appearance for the package.

It is appreciated that other configurations may be provided for the platform and that the bottom of the bag may be adjusted accordingly to retain or achieve the several advantages of this invention in providing a safety packaging arrangement. It can be appreciated that the purpose of the platform is to add stability to the arrangement and, in view of the relationship of the support rod 18 to the platform, it also adds stability to the packaging. The floral container is not permitted to move within the bag even should the bag be tipped.

When desired, the bag 12 may be made of transparent material to visually display the arrangement. As a result, the arrangement can be inspected before shipping to ensure that it is in order, and if not, repairs can be made. At the point of delivery, the delivery person can again inspect the product to ensure that everything is in order before presentation to the customer. The customer can immediately see the arrangement and thus get immediate surprise and satisfaction from the delivery. With the use of a plastic bag in surrounding the arrangement, it may be readily opened by simply cutting around the base of the bag above the platform. The cut bag can be lifted with support rod 18 away from the arrangement. This exposes the platform 14, whereby breaking the staple or other connecting arrangements, the platform may be removed from the arrangement.

Figure 7:
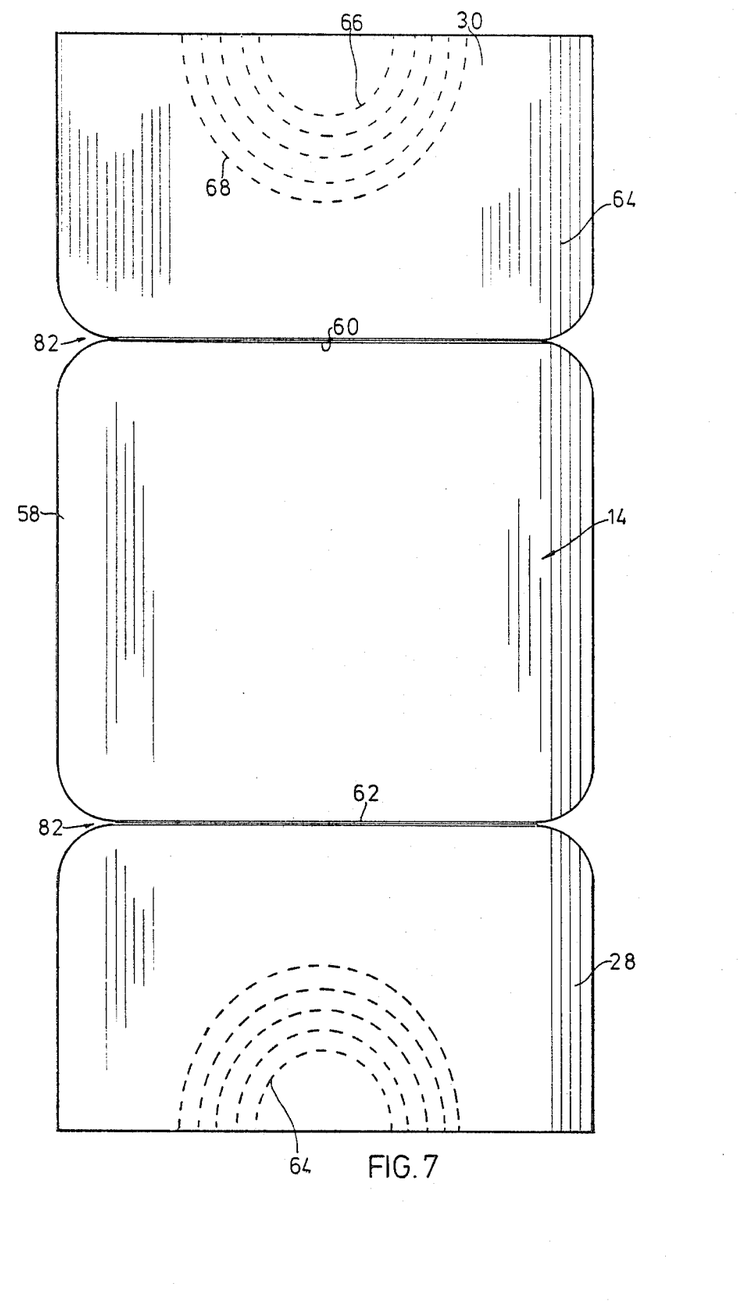
FIG. 7 is a plan view of the foldable platform blank.

Turning to the aspects of the platform blank, reference is made to FIG. 7. The foldable blank consists of a base portion 58 defined between parallel spaced-apart score lines 60 and 62 which extend transversely of the corrugations 64. The corrugations in the blank extend the length of the blank. The score lines 60 and 62 define hinge areas for the end flaps 28 and 30. The free end of each end flap has a medial or centrally positioned recess 64 and 66. In this embodiment, the outline of the recess is essentially semi-oval. A plurality of spaced-apart rows of perforations 68 are arranged symmetrically about the outline or circumference of the recesses 64 and 66. The shape of the recesses 64, 66 are such that, when the end flaps are folded towards one another and overlap, they define, when the platform is looked downwardly upon, a circular opening for various relative folded positions for the flaps. Thus, in an upper position for the folded flaps, they define a circular opening which readily engages circular pots, wicker baskets and bases which are of the taller variety.

In the past, it has been the approach to slit the platforms to define a plurality of fingers, such as that shown in U.S. Pat. No. 3,431,706, where fingers engage the bottom of the pot. In defining the pre-arranged fingers, there is little flexibility for accommodating varying shapes of containers.

Figure 8:
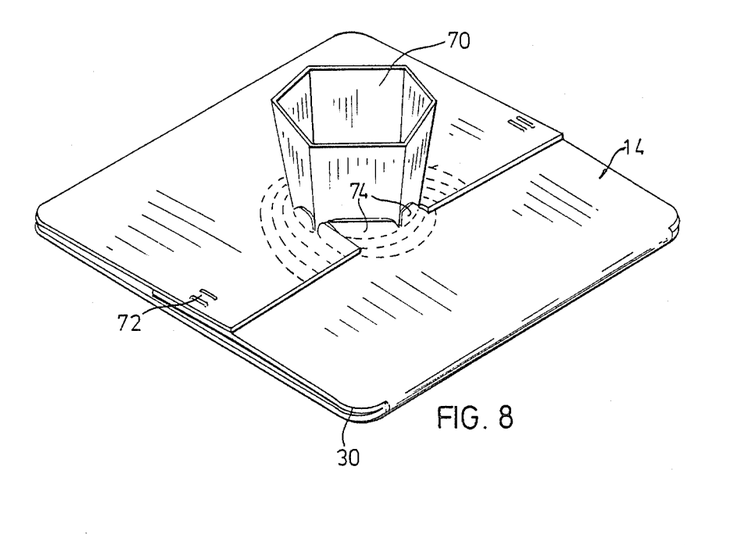
FIG. 8 shows the platform blank of FIG. 7 folded and engaging an irregular-shaped container.

Referring to FIG. 8, an example of an odd-shaped container 70 is shown, where the platform 14 as folded has its flaps ripped to accommodate the shape of the odd-shaped container 70. In this embodiment, it was unexpectedly discovered that the perforations arrested or stopped the tearing of the material between the perforations as the end flaps 28 and 30 are folded and forced downwardly onto the container sides. This forcing of the end flaps causes the flaps to tear along the corrugations and when the flaps have torn to the extent that the newly formed outline accommodates the shape of the container, the perforations stop tearing at that point, so that the tearing does not continue along the corrugations. The end flap portions are stapled together such as at 72 to maintain this positive engagement on the container 70 to hold it for purposes of arranging flowers therein and subsequent packaging. Therefore, with this type of flat, the end flaps, as folded and ripped, provide custom shaped fingers 74 which take on the outline of the particular article.

Figure 9:
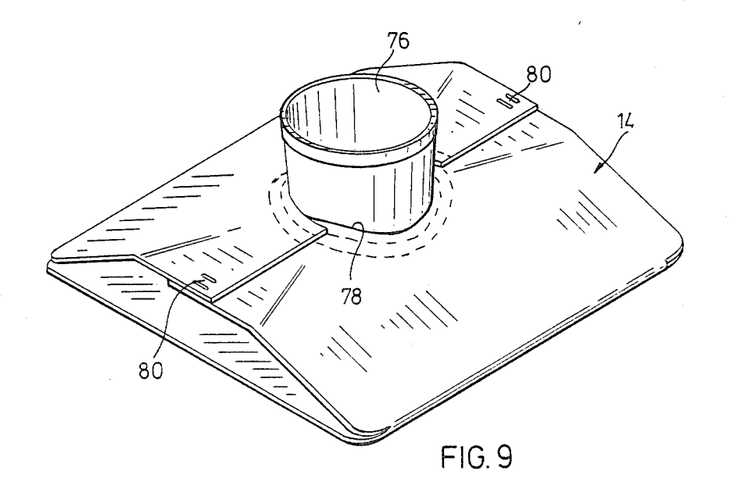

Referring to FIG. 9, the perforations also provide for removing portions of the end flaps to enlarge the recess. This allows the use of the platform 14 to accommodate larger containers such as the flower pot 76 shown in FIG. 9. It can be seen that two strips of the end flaps have been removed along the perforations to enlarge the recess opening 78, as it engages the larger circular upright walls of the container 76. Again, once the end flaps have been forced downwardly to provide proper engagement with the container sidewalls, the end flaps are stapled together as at 80 to complete assembly and maintain engagement with the flower pot. The platform is waterproofed and, according to a preferred embodiment of the invention, the waterproofing is by wax impregnating the corrugations.

To provide a wide variety in adaptations of the recess to sizes of container and in terms of tearing the end flaps to receive odd-shaped containers, four sets of perforations 69 are provided. It is appreciated that more or less may be incorporated into the platform blank depending upon the use of the blank.

The extent of overlap of the flaps, when folded towards each other, may vary depending upon the use. According to this embodiment, a preferred degree of overlap is to enable stapling of the sections together and is achieved by making the end flap of a length approximately two-thirds of the distance between the score lines on the platform base.

To facilitate insertion of this type of platform in bags and the like, it can be seen that at the extremities of score lines 60, 62, V-shaped portions 82 are provided to define, when the flaps are folded towards one another the radiused corners 30 of FIGS. 5 and 8.

It can, therefore, be appreciated that the platform of this invention for floral arrangements readily accommodates various types of containers and firmly secures the containers, when the platform of the invention is used in combination with the bag and support rod arrangements, there is a vast improvement in handling the arrangement. The floral arrangements may be packed on the basis of platform abutting platform, since the breadth of the platform is designed to be at least as broad as the dense portion of the floral arrangement. Further, the slight inflation of the bag prevents any sharp object, or the like, immediately puncturing the floral arrangement during delivery.

Although various embodiments of the invention have been described herein in detail, it will be understood by those skilled in the art that variations may be made thereto without departing from the spirit of the invention or the scope of appended claims.

The embodiments of the invention in which an exclusive property of privilege is claimed are defined as follows:

1. A foldable platform blank which, when folded, is adapted for engagement with floral arrangement containers, said blank being waterproofed corrugated cardboard with its corrugations extending the blank's length, two spaced-apart parallel score lines extending transversely of said corrugations to define hinge areas for providing similar platform end flaps, each flap free end having a medial recess and a plurality of spaced-apart rows of perforations arranged symmetrically about and spaced inwardly from the outline of said recess, the length of each end flap being greater than one-half and less than the distance between said score lines to provide overlapping end flap portions for securement to each other when folded to engage recess outline with a floral arrangement container.

2. A foldable platform blank of claim 1 wherein said end flap portions are adapted to clamp such container with the overlapped flap portions forced downwardly and secured to one another as they are folded to engage a container with their hinge lines fixed relative to the blank's base between said score lines.

3. A foldable platform blank of claim 1, wherein said perforations arrest ripping of said blank along said corrugations as said end flaps are folded and said recess is forced to conform to shape of floral arrangement container.

4. A foldable platform blank of claim 1 wherein said recess in each end flap is essentially semi-oval.

5. A foldable platform blank of claim 4, wherein said semi-oval recesses define a circular opening for multiple folded positions of said end flaps as they overlap.

6. A foldable platform blank of claim 1, wherein four symmetrically spaced-apart rows of perforations are provided about said recess.

7. A foldable platform of claim 1, wherein said rows of perforations are spaced-apart approximately twice the width of a single corrugation in said cardboard.

8. A foldable platform blank of claim 1, wherein said waterproofed corrugated cardboard is wax impregnated.

9. A foldable platform blank of claim 1, wherein each end flap length is approximately two-thirds the distance between said score lines.

10. A foldable platform blank of claim 9, wherein a base portion defined between said score lines is essentially square.

11. A foldable platform of claim 1 in combination with a bag having fitted bottom for receiving said platform engaged with a floral arrangement container and extending above a floral arrangement, a support rod for embedding in base of floral arrangement and extending from container bottom to above said arrangement, said bag being secured about said rod above said arrangement to provide a carrying grip for packaged floral arrangements and to maintain said platform in said fitted bag bottom during handling of a packaged floral arrangement.

12. A packaging combination of claim 11, wherein said bag has a fitted gusseted bottom to receive said platform with bag sides adjacent platform perimeter, said gusseted bag bottom providing pockets exterior of bag bottom to provide an inflatable means on platform underside which inflates on lifting and carrying the packaged arrangement by air moving from above said platform to beneath into said pockets due to the weight of the carried floral arrangement moving bag sides inwardly, the inflated means absorbing shock when carried floral arrangement is set down due to its deflating by air returning from said pockets to above said platform.

13. A packaging combination of claim 12, wherein said platform is rectangular having radiused corners, said bag having rectangular-shaped gusseted bottom where said platform radiused corners facilitate insertion of platform into bag.

14. A packaging combination of claims 11, 12 or 13, wherein a device pinches said bag about said support rod to effect bag closure and securement of bag to rod.

15. A packaging combination of claims 11, 12 or 13, wherein said platform is generally broader than the expected width of dense portion of a floral arrangement.

16. A packaging combination of claim 11, wherein said recess in each end flap of the platform is essentially semi-oval.

17. A packaging combination of claim 11, wherein said platform is waterproofed by wax impregnation of the corrugations.

18. A packaging combination of claim 13, wherein said end flap of the platform has a length approximately equal to two-thirds the distance between said score lines in the platform blank.

19. A safety packaging for a floral arrangement in a container comprising in combination a platform for engagement with a container for a floral arrangement, said platform being generally broader than expected breadth of dense portion of a floral arrangement, a support rod embedded in a floral arrangement base portion and extending from bottom of container to above such floral arrangement, a plastic bag having a fitted bottom to receive said platform with bag side adjacent platform perimeter, said bag being of a length to extend upwardly to the upper portion of said support rod, said bag being secured tightly about the rod upper portion to provide a carrying grip at bag closure, such securement maintaining said platform in said fitted bag bottom to stabilize said packaging combination during handling.

20. A safety packaging of claim 19, wherein said fitted bag bottom is gusseted to provide bag bottom portion with pockets exterior of bottom portion and in communication with bag interiors, said pocket providing an inflatable means on platform underside which inflates on lifting and carrying a packaged arrangement by air moving from above said platform to beneath into said pockets by virtue of the weight of a carried floral arrangement moving bag sides inwardly, said inflated means absorbing shock when carried floral arrangement is set down as it deflates by air returning from said pockets to above said platform.

21. A safety packaging of claims 19 or 20, wherein said platform is rectangular-shaped with radiused corners, said bag having correspondingly shaped gusseted bottom where said platform radiused corners facilitate insertion of platform into said bag.

22. A safety packaging of claims 19 or 20, wherein a device pinches said bag about said support rod to effect bag closure.

* * * * *